(12) United States Patent
Kellens et al.

(10) Patent No.: US 8,133,519 B2
(45) Date of Patent: Mar. 13, 2012

(54) CRYSTALLIZATION APPARATUS AND PROCESS FOR MOLTEN FATS

(75) Inventors: Marc Kellens, Mechelen-Muizen (BE); Marc Hendrix, Balen (BE); Gijs Calliauw, Onze-Lieve-Vrouw-Lombeek (BE)

(73) Assignee: N.V. DeSmet Ballestra Engineering S.A., Zaventem (BE)

( * ) Notice: Subject to any disclaimer, the term of this patent is extended or adjusted under 35 U.S.C. 154(b) by 386 days.

(21) Appl. No.: 12/410,949

(22) Filed: Mar. 25, 2009

(65) Prior Publication Data

US 2009/0246339 A1   Oct. 1, 2009

(30) Foreign Application Priority Data

Mar. 28, 2008   (GB) ................................. 0805658.2

(51) Int. Cl.
*A23C 15/14*   (2006.01)
(52) U.S. Cl. ......................................... 426/417; 99/495
(58) Field of Classification Search .................. 426/417; 99/495
See application file for complete search history.

(56) References Cited

FOREIGN PATENT DOCUMENTS

| | | |
|---|---|---|
| EP | 1 818 088 | 8/2007 |
| GB | 2053019 A * | 2/1981 |
| GB | 2100613 A * | 1/1983 |
| GB | 2 180 253 | 3/1987 |

OTHER PUBLICATIONS

Search Report from the UK Intellectual Property Office for British Patent Application No. 0805658.2, dated Jul. 8, 2008.

* cited by examiner

*Primary Examiner* — Deborah D Carr
(74) *Attorney, Agent, or Firm* — Wegman, Hessler & Vanderburg

(57) ABSTRACT

Methods and apparatus are described for the production of a crystal slurry during the crystallization step of fractionation processes of edible oils and fats and related oil derivatives. The crystallization process for edible oil and fats is carried out in a crystallizer with stationary heat exchange elements, wherein the contents of said crystallizer are made to move along said heat exchange elements in an oscillatory manner without the use of an internal agitator. The crystallizer for edible oil and fats with stationary heat exchange elements is also described.

38 Claims, 3 Drawing Sheets

CRYSTALLIZATION APPARATUS AND PROCESS FOR MOLTEN FATS

CROSS-REFERENCE TO RELATED PATENT APPLICATIONS

This application claims the benefit of British Application No. GB0805658.2 filed Mar. 28, 2008, which is hereby incorporated by reference.

FIELD OF THE INVENTION

The invention relates to methods and apparatus for the production of a crystal slurry during the crystallization step of fractionation processes of edible oils and fats and related oil derivatives.

BACKGROUND OF THE INVENTION

The widely different properties of edible oils and fats stem from the chemical identity of their fatty acids. If these fatty acids have a chain containing sixteen or more carbon atoms and this chain is fully saturated, the resulting triglycerides have a melting point in excess of 60° C. On the other hand, if the fatty acid carbon chain contains one or more double bonds, the resulting triglycerides have much lower melting points.

Edible oils are natural products, meaning that they have been obtained by the processing of agricultural products. These products may be oilseeds in the case of vegetable oils and fats or they may be of animal origin in the case of, for instance, beef or mutton tallow, lard and fish oil. Both vegetable and animal oils and fats display a wide variety of different fatty acids with respect to chain length, degree of unsaturation, position of the double bonds in the carbon chain and geometrical configuration of the double bonds.

If triglycerides were to contain only a single type of fatty acid, the large number of different fatty acids would already cause edible oils and fats to be a complex mixture of different triglycerides. However, since triglycerides generally contain two or three different types of fatty acids, the number of chemically different triglycerides in edible oils and fats is very high indeed. Accordingly, the crystallization behavior of edible oils and fats is fundamentally different from the crystallization of pure compounds like sugar or citric acid destined for the food industry, compounds like p-xylene or terephthalic acid in the petrochemical industry and especially inorganic salts like sodium chloride or sodium carbonate.

The situation is even more complicated because triglycerides can crystallize in different polymorphs having different crystal morphologies. If they are not too different, chemically different triglycerides can form mixed crystals, which affects their solubility. Moreover, edible oils and fats products used in industry always contain partial glycerides (mono- and diglycerides) and their concentration varies. Some of these partial glycerides retard crystal growth and thereby affect the crystallization process of edible oils, which is therefore far more difficult to control than the great majority of industrial crystallization processes.

Fat crystallization affects a large number of food products and processes. It should, for instance, provide chocolate with a snap upon breaking and it should prevent margarine from oiling out. On the other hand, the fat crystals in ghee should sink to the bottom of the container and leave a clear supernatant. In puff pastry, the fat crystals should provide the product with plasticity; in physically ripened cream, the crystals should facilitate churning; in dry fractionation, the crystals should permit the olein to be separated from the stearin. These various demands can only be met by different crystal morphologies and arriving at these different morphologies necessitates using different crystallization techniques: tempering for chocolate, scraped heat exchangers for margarine, a slow cooling for ghee, patience for cream and a several different processes for the fractionation of edible oils and fats.

These different fractionation processes can be divided into three categories: solvent fractionation, detergent fractionation and dry fractionation. Because the solvents used in the solvent fractionation process are inflammable, building an explosion-proof solvent extraction plant is expensive and the recuperation of the solvents is also an energy intensive process. For that reason, no new solvent fractionation plants are being built. The detergent fractionation process originally attained a better selectivity than the dry fractionation process but since the latter process has been improved considerably with respect to selectivity and olein yield, no new detergent fractionation capacity is being installed either. Consequently, all development effort is currently directed towards the dry fractionation process.

In this process, the edible oil or fat to be fractionated is first completely melted, heated for some time to erase crystal memory and then cooled in a controlled manner. This is commonly done in a vessel comprising an agitator and heat exchange elements but the use of trays moving through a cooling tunnel has also been disclosed, as in EP 0 798 369. Cooling is slow (several hours) and the industry employs different cooling profiles for different fats and oils, so there is a large variation in crystallization time. When the crystallization is observed to have reached a certain stage, the crystallization process is interrupted. This can be by terminating the cooling and feeding the crystallizer contents to a filter, or by transferring the crystal slurry to a holding vessel from where a filtration unit is fed with this crystal slurry and separated into a filtrate which is commonly referred to as olein and a filter cake, the stearin. Such a filtration unit can be a nozzle or conical sieve centrifuge as disclosed in U.S. Pat. No. 4,542, 036, a membrane press or a vacuum belt or drum filter.

The performance of this separation unit is highly critical with respect to stearin properties, product yields and the economics of the process. If more olein is retained in the filter cake, the fractionation becomes less selective, the stearin properties deteriorate and the olein yield decreases. This is especially deleterious in multi-stage fractionation processes where these pernicious effects are multiplied. Accordingly, attempts are being made to produce stearin filter cakes with the lowest possible olein content.

Two approaches can be distinguished in these attempts. There is the approach that aims at reducing this olein content by adapting the filtration stage as illustrated by the introduction of the centrifuge or the membrane press, and there is the approach that aims at the formation of crystals with a morphology that facilitates olein release during filtration. However, there is no consensus on which crystal parameters facilitate this release or how to specify them, and even if there were, it would still be unclear how to carry out a crystallization of edible oils and fats that ensures that the specifications are met in a preferably reproducible manner. Moreover, there is no consensus either whether this approach should focus on the crystallization hardware (crystallizer, heat exchange elements and agitator) or its software (temperature profile and control).

At the start of a batch crystallization process, the oil or fat to be crystallized is heated some 10° C. above its melting point so that it is completely melted. If this is done within an agitated vessel fitted with heat exchange elements such as, but not limited to, a coil, double jackets or vertical fins or any arrangements of those elements, this heating can be quite fast since it can tolerate a relatively large temperature difference between the heating medium inside the heat exchange elements and the oil or fat to be heated. If the vessel has been provided with a variable speed agitator, this can also run at its maximum speed and thus increase the heat transfer coefficient.

Cooling, on the other hand, may require a much smaller temperature difference between the heating medium and the oil or fat, especially when the heating medium temperature is below the melting point of the oil or fat since too cold a heat exchange surface may cause crystals to be deposited onto that surface and encrust it so that heat transfer is impeded. Cooling may be fast until the cloud point of the fat has been reached but should then be reduced to values in the order of magnitude of around 10° C. per hour to prevent serious supercooling.

Crystals can only grow in a supersaturated (i.e., supercooled) melt but to start growing, they need a nucleus on which to grow. In nucleation, a distinction is made between homogeneous nucleation and heterogeneous nucleation. In the former process, the triglyceride molecules themselves arrange themselves in such a way that they form an incipient crystal, which can then start to grow. This process requires undercooling by up to 30° C. so that in industrial practice, nucleation is heterogeneous only. This is illustrated by the well-known phenomenon that oleins are more difficult to crystallize since heterogeneous nuclei present in the raw material have been concentrated in the stearin so that there are only few left in the olein.

In addition to the two primary nucleation mechanisms mentioned above, there is also secondary nucleation. According to one theory, secondary nuclei form whenever tiny crystals, embryos, are removed from the crystal surface and exceed the critical size. This requires this surface to be rough and the rate of crystal growth must be so slow that the clusters can diffuse away from the crystal face before they become incorporated in the crystal. According to another theory, clusters of more or less oriented molecules may diffuse away from the growing crystal and some of these may subsequently form a new nucleus. The theories are not mutually exclusive and both theories are in accordance with the observation that strong agitation can lead to the formation of many small crystals that are considered to result from secondary nucleation. If these small crystals are mixed with larger crystals, which started to grow earlier, the resulting filter cake will have a poor permeability and retain substantial amounts of olein.

SUMMARY OF THE INVENTION

It is therefore an object of the invention to provide improved methods and apparatus for the production of a crystal slurry during the crystallization step of fractionation processes of edible oils and fats and related oil derivatives. In particular, an object of the present invention is to avoid the use of internal agitators.

It has surprisingly been found that the above object can be realized by a crystallization process for edible oil and fats carried out in a crystallizer with stationary heat exchange elements, wherein the contents of said crystallizer are made to move along said heat exchange elements in an oscillatory manner without the use of an internal agitator.

The above object can also be realized by a dry fractionation process for edible oils and fats in which a crystal slurry produced according to the above-mentioned process is separated into an olein fraction and a stearin fraction.

The above object can also be realized by a crystallizer for edible oil and fats and related derivatives with stationary heat exchange elements, comprising means for moving the contents of said crystallizer along said heat exchange elements in an oscillatory manner without the use of an internal agitator. An advantage of the present invention is the suppression of secondary nucleation during the crystallization of edible oil and fats from the melt. Another advantage is an improvement in the filtration characteristics of the resulting crystal slurry, and/or the olein yield and/or the stearin properties.

The movement is preferably a pressure-induced movement, i.e., induced by pressure changes in a fluid in fluid communication with the contents of the crystallizer. Avoiding the use of an internal agitator diminishes shear forces within the melt being crystallized and this may suppress secondary nucleation. Replacing an agitator by pressure-induced movement of the melt being crystallized along the heat exchange elements has been found to offer a number of additional advantages. It reduces the cost of construction of the crystallizer and also reduces energy consumption during operation. It also ensures heat transfer and thereby promotes crystallization but does this in such a gentle manner that growth of existing crystals is favored and the formation of new crystals is discouraged. As a result, the crystals in the slurry are much more uniform in size and morphology than in slurries produced by the prior art processes employing mechanical agitators. Their uniformity avoids filter cake clogging and promotes cake drainage, which is especially advantageous when subsequently a conical sieve centrifuge is used for the separation of the crystals from their mother liquor, the olein.

An additional advantage of the present invention is the possibility to operate a continuous or semi-continuous crystallization process. Indeed, the oscillatory movement of the crystallizer content can be tuned in such a way that a continuous oscillatory flow crosses the crystallizer vessel or vessels.

BRIEF DESCRIPTION OF THE DRAWINGS

FIG. 1 illustrates a batch crystallization apparatus and process according to an embodiment of the present invention, where F is a fan and P is a piston and wherein the oscillatory movement is transmitted to the contents of said crystallizer by means of repeated pressure variations applied to the crystallizer contents, e.g., using top or bottom pneumatically or mechanically driven oscillation.

FIG. 2 illustrates a continuous crystallization process and apparatus using external oscillation and two serial vessels set at different temperatures T1 and T2, e.g., 30° C. and 25° C., respectively, according to an embodiment of the present invention, wherein the oscillatory movement is transmitted to the contents of said crystallizer by means of repeated pressure variations applied to the crystallizer contents and I indicates incoming hot oil, e.g., palm oil at 50° C., D1 is a dosing piston pump, e.g., piston driven and S indicates separation, e.g., by filter, filter press or centrifuge. The construction of the crystallizer comprising two vessels renders possible the operation at two different processing conditions, e.g., temperatures, if desired.

FIG. 3 illustrates a batch or semi-continuous crystallization process and apparatus using external oscillation, according to an embodiment of the present invention, wherein the oscillatory movement is transmitted to the contents of said crystallizer by means of repeated pressure variations applied to the crystallizer contents via a side pipe and D2 is a piston driven oscillator or dosing piston pump and S indicates separation, e.g., by filter, filter press or centrifuge.

DETAILED DESCRIPTION OF THE INVENTION

Figure 1:
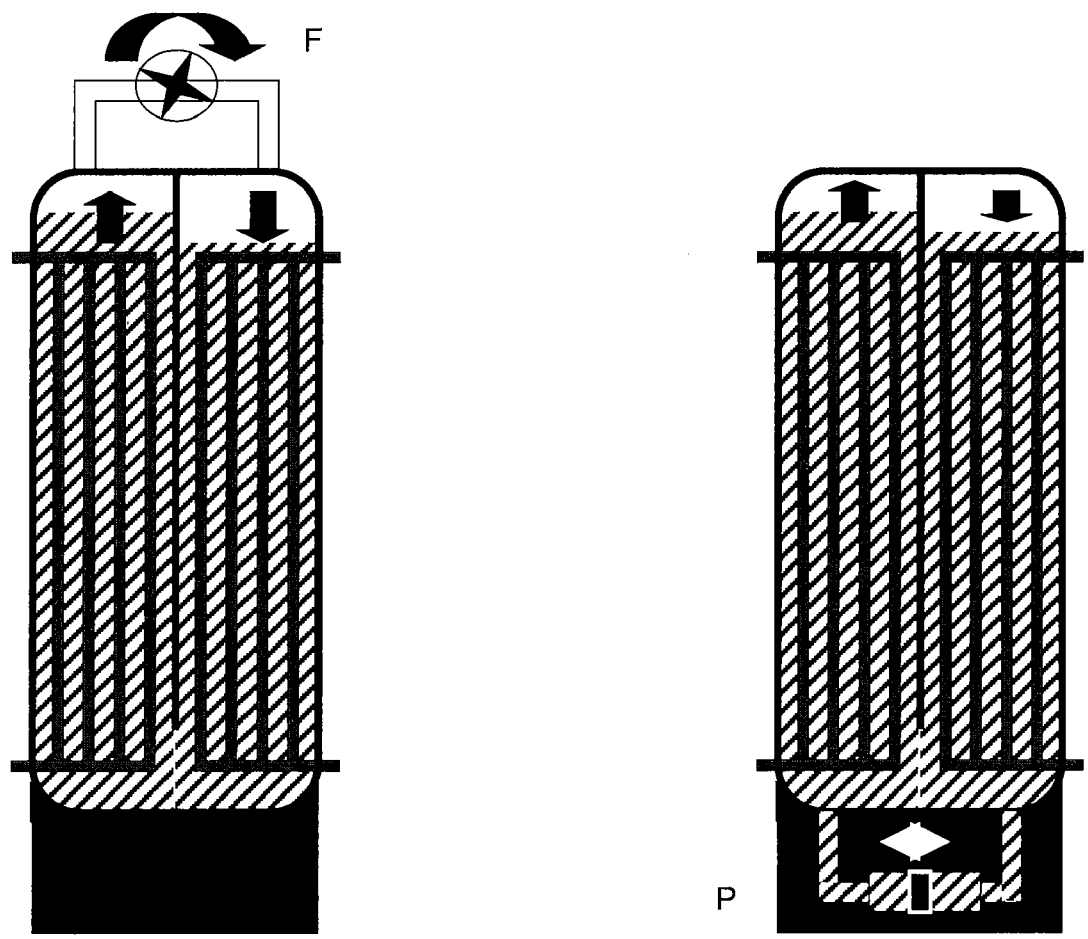
FIGS. 1 to 3 illustrate crystallizers according to embodiments of the present invention, wherein the oscillatory movement is transmitted to the contents of said crystallizer by means of repeated pressure variations applied to the crystallizer contents. These figures are listed to illustrate the present invention but the present invention is not limited to those particular constructions or dispositions.

The present invention will now be described with reference to certain embodiments and with reference to the above-mentioned drawings. Such description is by way of example only and the invention is not limited thereto.

The apparatus and the process of the invention can be used for a large variety of edible oils and fats and their related derivatives. They can be used for oils and fats that are currently being fractionated by standard dry fractionation processes and it can also be used to manufacture at least some of the fractionation products that are currently produced by solvent fractionation processes, such as, but not limited to, specialized confectionery fats. Given the surprising results of the apparatus and the process according to embodiments of the present invention, it is only to be expected that it will widen the scope of edible oil and fat fractionation beyond the current field of application of fractionation. The apparatus or process according to embodiments of the present invention can allow the full realization of the economical and environmental advantages of the dry fractionation process such as: a relatively low investment, the absence of yield loss, a low energy requirement and a low environmental impact because it does not require chemicals or solvents, and hardly produces any effluents.

The oils and fats that can be used in the process of the present invention can have an animal origin such as beef tallow, chicken fat or fish oil. They can also be a vegetable oil or fat, such as, but not limited to, palm oil and cottonseed oil. They can be a direct agricultural product but they can also be an intermediate, modified product such as, but not limited to, a partially hydrogenated oil or fat such as brush hydrogenated soya bean oil that has to be winterized to provide a salad oil or a trans-rich vegetable oil used as a precursor for confectionery fats. It can also be a fractionation product, in which case the process according to the present invention is used in a multi-stage fractionation process. The fat to be fractionated in the process according to the present invention can also be an interesterification product, either resulting from a homogenous interesterification or randomization, or from a heterogeneous interesterification also referred to as directed interesterification.

The oil or fat to be used in the process of the present invention is preferably at least partially refined because this favors the reproducibility of its crystallization. The phosphatide content should preferably have been reduced by a degumming process to below 10 ppm phosphorus and its free fatty acid content should preferably have been reduced by a neutralization process to below 0.1% by weight as expressed as oleic acid, but the invention is in no way limited to these values. The neutralization process can be any suitable process of which a chemical neutralization employing a caustic alkali or a physical neutralization employing vacuum steam stripping are only two examples. There is no need to bleach the chemically neutralized product before it is used in the process according to the invention.

During said process, the oil or fat to be fractionated is preferably first completely melted and heated to some 10° C. above its melting point to erase the so-called crystal memory. Since the fat to be processed will be stored in a tank as molten, it can be pumped from there through a simple plate or tube-and-shell heat exchanger that raises its temperature to whatever level is set. Using an external heat exchanger to heat the oil or fat is preferred to using the crystallizer and process according to embodiments of the present invention for heating purposes. The former is simpler because it allows the heat exchange elements inside the one or more crystallization vessels to be used for cooling only as well as saving time.

The crystallizer to be used in the process of the present invention has in common with most crystallizers currently used for the dry fractionation of oils and fats that its one or more crystallization vessels or compartments comprise internal, stationary heat exchange elements. It differs from currently used crystallizers such as the crystallizer disclosed in U.S. Pat. No. 4,202,859 in that it does not have an agitator. It may comprise two or more (e.g., three, four, five, etc.) communicating vessels or compartments, which may be independently cooled. It also has means causing the oil to move with respect to the heat exchange elements in an oscillatory manner.

The configuration of the internal, stationary heat exchange elements is not particularly critical. They can be spiral coils, vertical tubes or fins that are fixed to the crystallizer wall or other type of heat exchange elements in current use such as double jackets. However, since the crystallizer used in the process according to the invention is without internal agitator, the heat exchange elements can be spaced evenly throughout the one or more crystallization vessels or compartments. This greatly improves the heat transfer efficiency. Care has to be taken that there is a sufficiently large heat exchange surface. This has been found to be preferably at least 1 $m^2$ per $m^3$ crystallization vessel volume. On the other hand, too large a surface area will occupy too much crystallization vessel volume so it should preferably be less than 20 $m^2$ per $m^3$ crystallization vessel volume. The preferred range is from 3 to 10 $m^2$ per $m^3$ crystallization vessel volume. Preferably, the vessels do not contain dead zones, e.g., the heat exchange elements do not retain fat crystals when the one or more crystallization vessels are emptied at the end of the crystallization cycle in the case of a batch crystallization process according to an embodiment of the present invention. This precaution holds true in the case of a continuous crystallization process: the heat exchange elements will not provide dead spots or obstacles to the oscillatory flow of the crystallizer content. Accordingly, when the crystallizer comprises one or more vertical cylindrical crystallization vessels, vertical tubes or fins are preferred over spiral coils.

In the apparatus and process according to the present invention, the contents of the one or more crystallization vessels are made to move along the heat exchange elements in an oscillatory manner such as by the intermittent application of pressure, e.g., by means of gas (e.g., nitrogen or carbon dioxide or a mixture of both) injected into and released from the headspaces of the compartments, a reciprocating piston or a dosing piston pump. This can be achieved in a number of ways. Changing the pressure in an oscillatory manner in a fluid in fluid communication with the contents of the vessel is a preferred method. In one embodiment the crystallizer comprises a single, vertical crystallization vessel; this vessel may have been provided with a side-tube near the bottom of the vessel so that during operation, it will be filled with oil. If then the volume of this side-tube is altered, the oil in the vessel will be moved along the heat exchange surfaces inside the crystallization vessel. A system for moving the vessel contents comprising a reciprocating piston has been disclosed in U.S. Pat. No. 3,723,069.

In another embodiment, the crystallization vessel is horizontal—or almost horizontal to facilitate emptying—and is provided with tubes bending upwards at both ends and extending above the vessel. Said crystallization vessel should be filled with oil or fat to be crystallized in such a way that the vessel itself is completely full so that the upward tubes are also partially full. If then the oil level in one of the upward tubes is lowered, it will rise in the opposite tube and inside the vessel, the oil will move along the heat exchange surfaces. If the vessel is not completely full, oil will also move along said surfaces but heat exchange will be less effective.

A preferred embodiment of a crystallizer has been illustrated in FIG. 1. It comprises a crystallization vessel that has been separated into two compartments by a divider that provides an airtight seal at the top of the crystallizer but does not extend to the bottom of the crystallizer so that the two compartments are in fact communicating vessels enabling oscillatory movement of the vessel contents along the stationary heat exchange elements. In FIG. 1, the two compartments are equal in size but the invention is not limited to such a symmetrical division of the crystallizer nor to just two compartments.

Figure 2:
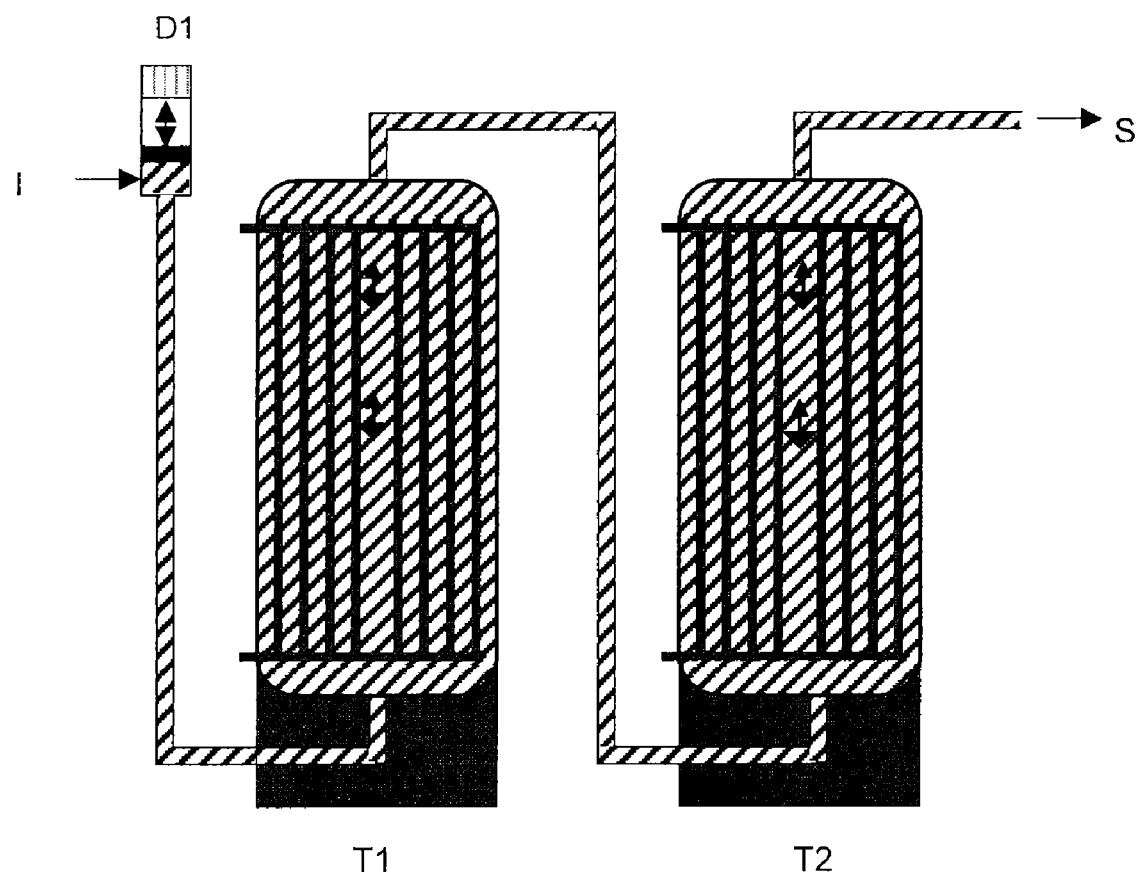
Figure 3:
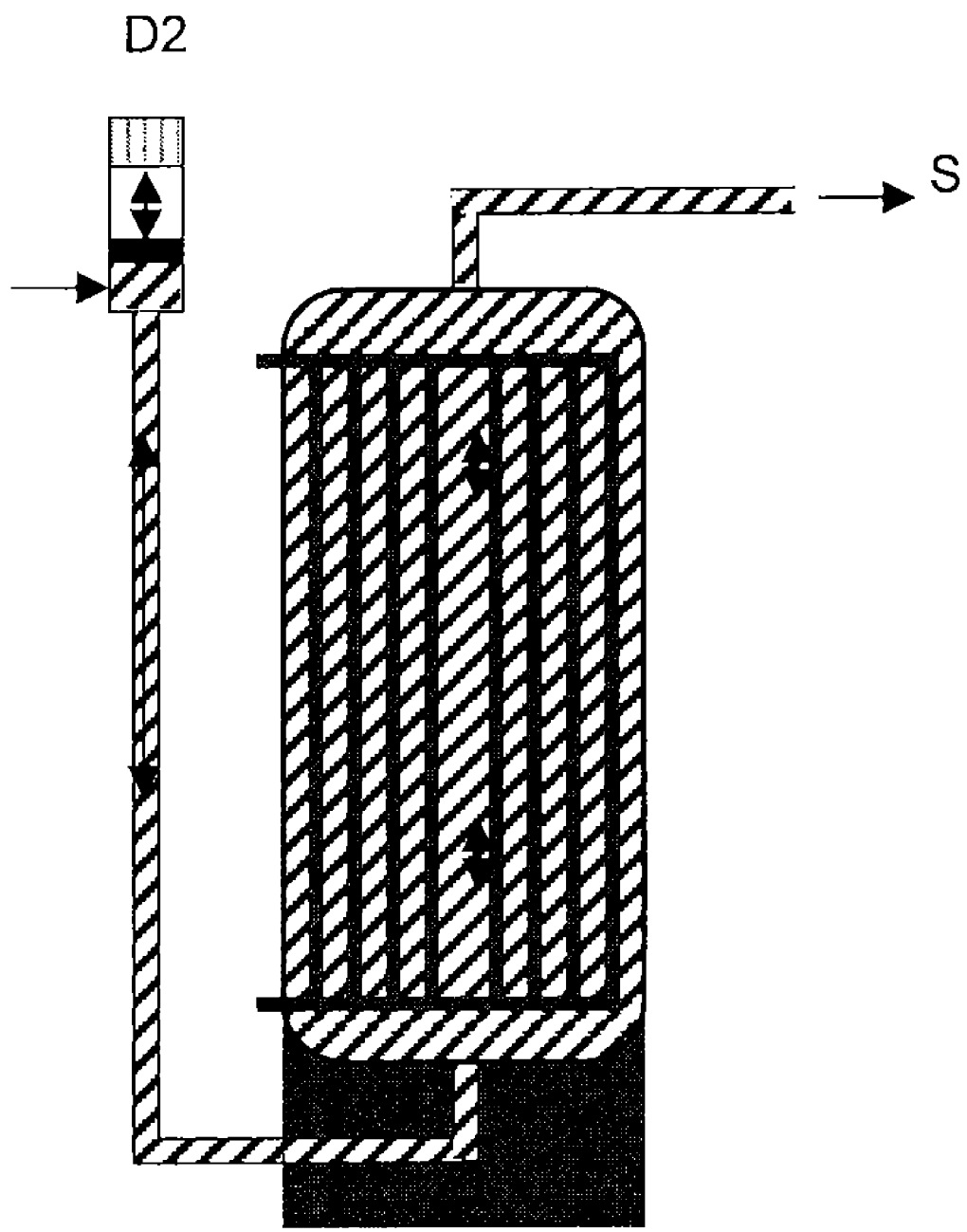

Another preferred embodiment of the present invention is illustrated by a crystallizer described in FIG. 2. This crystallizer comprises two separate vessels communicating with each other through ducts connected to said vessels. Crystallization temperature of each vessel can be selected independently if desired. A crystallizer configuration in which one or more of said vessels comprises one or more compartments also falls within the scope of the present invention. FIG. 3 describes, for example, a crystallizer made of one vessel of one compartment. The apparatus illustrated in FIGS. 2 and 3 is particularly preferred when continuous or semi-continuous crystallization processes are desired: the oscillatory movement of the crystallizer content can be tuned in such a way that a continuous or semi-continuous flow crosses the crystallizer vessel or vessels.

The heat exchange elements represented in FIGS. 1 to 3 comprise vertical tubes connected to collectors/distributors located in the upper and lower parts of the vessel, respectively. It is an additional advantage of the present invention that it permits a great freedom in the design of said exchange elements due to the absence of an internal agitator. The embodiment shown in FIG. 1 comprising a single bundle shared by two compartments is just an example. Another construction comprising one cooling bundle per compartment is also perfectly within the scope of the invention.

As illustrated in FIG. 1, the oscillatory movement can be realized by any suitable oscillatory fluid pressure means such as a ventilator or fan positioned inside a duct connecting the two compartments whereby the connections between the duct and the vessel are preferably airtight to allow a pressure build-up when the fan rotates. As indicated in FIG. 1, this fan can rotate in both senses. Accordingly, its sense of rotation determines above which compartment the pressure will increase and thereby from which compartment the liquid will be forced into the other compartment. Therefore, changing the sense of rotation will cause an oscillating movement of the crystallizer contents. The speed of rotation of the fan determines by how much the pressure will increase and thus the amplitude of the oscillating movement. As indicated in FIG. 1, another means to generate the oscillatory movement is the use of a piston located in the duct connecting the two compartments of the crystallizer vessel. As illustrated in FIGS. 2 and 3, another means to generate the oscillatory movement is the use of a dosing piston pump. This solution is selected when a continuous or semi-continuous crystallization process is desired.

Amplitudes of the oscillatory movement of the crystallizer contents along the stationary heat exchange elements preferably ranging from 0.01 to 0.50 meter have been found to be effective so that these are the preferred values but the present invention is not limited to these exact values.

Indirectly, the rate of change of the speed at which the fan rotates, or the piston oscillates determines the rate of movements of the crystallizer contents. Frequencies of the oscillatory movement of the crystallizer contents along the stationary heat exchange elements ranging from 0.1 to 10 Hz have been found to be effective but the present invention is not limited to these values. It has also been established that linear speeds of the oil or fat with respect to the fixed heat exchange elements of about 10 m/min are already effectual for cooling, but the present invention is not limited to this precise value.

Any suitable way to generate an oscillatory movement in the crystallizer contents is included within the scope of the invention. It can for instance also be generated by the use of a compressed gas such as an inert gas, non-limiting examples being nitrogen or carbon dioxide or mixtures thereof or even air in the case of very stable oil or fat. In that instance, the compartments must be fully closed at the top so that their headspaces can be pressurized and the pressure can be subsequently released via one or more exhaust valves. Yet another means of generating an oscillatory movement comprises a pulsing chamber, which communicates with a gas cushion that is alternatively compressed and expanded by a piston. Such means has been disclosed in U.S. Pat. No. 3,723, 069.

As disclosed in German laid-open specification DE 102 51 059, oscillatory movement can also be realized by means of cyclic physical contact applied to the surface of the oil or fat contained in said crystallizer, for example, with the use of a float-board. This construction has the advantage of extreme mechanical simplicity. Nevertheless the present invention is by no means limited to this description and other mechanical dispositions leading to the oscillatory movement of the oil or fat contained in said crystallizer also fall within the scope of the present invention.

When the frequency of the oscillatory movement of the oil or fat contained in the crystallizer corresponds to the eigenfrequency (also called natural resonant frequency), of said crystallizer, maintaining this frequency requires a minimal energy input. Therefore, if attainable given the geometrical dimension of said crystallizer, operating at the particular eigenfrequency of said crystallizer is preferred as it minimizes the energy input needed to realize the movement of the oil or fat contained in said crystallizer. Nevertheless, the present invention is by no means limited to this particular frequency. In fact, it is an advantage of the process according to the present invention that the rate at which the oil or fat is made to move along the heat exchange surface fitted inside the one or more crystallization vessels can be freely chosen. So when a high crystal content has made the partially crystallized oil or fat very viscous, pressurizing the system will continue to move the crystal slurry along the heat exchange surfaces in a fully controllable manner.

After the crystallizer has been filled with molten fat or oil to be crystallized according to the present invention, this oil or fat must be cooled in such a manner that a slurry of uniform crystals is formed. To this end, the cooling process is started while the contents of said crystallizer are made to move along the heat exchange elements in one of the manners described above. Cooling is affected by circulating a heat exchange medium such as, but not limited to, water through the heat exchange elements and controlling its temperature. This control can be affected by injecting a stream of chilled heat exchange medium into the circulating stream and collecting and chilling the excess caused by this injection.

The amount to be injected will be controlled by the actual temperature of the heat exchange medium and the temperature set point, whereby this set point may vary with the batch temperature or be prescribed by a time-temperature program. Both the control method employing a temperature difference with the batch temperature and the time-temperature approach rely heavily on past experience with the type of oil and fat being crystallized. Some fats have been found to be relatively easy to crystallize and still yield a slurry with uniform crystals when crystallized relatively fast whereas others have been found to yield a paste of many fine crystals when subjected to the same cooling regime.

Because the one or more crystallization vessels or compartments used in the process according to the present invention lack internal agitation and since said process aims at generating uniform and preferably large crystals and since these crystals have a higher density than their mother liquor, they may collect in the lower part of said vessels or compartments. Accordingly, it can be advantageous to introduce some form of mixing such as, for instance, a pump that collects material from the bottom part of the vessel or compartment and feeds this into the top part, provided strong shear forces are avoided as much as technically feasible. This pump can also be used to transfer the crystallizer content to the equipment used to separate the crystals from their mother liquor.

An example of a temperature profile used in the development of the present invention is shown in Table 1. When this temperature profile, in combination with the typical parameters discussed in the above paragraphs, was applied in a fractionation of palm oil and when the Solid Fat Content (SFC) of the slurry had reached 11%, the slurry was filtered in a membrane filter press and applying a pressure of 15 bar led to a filter cake with an SFC of 53%.

TABLE 1

| Temp (° C.) | Ramp (min.) | Isotherm (min.) | Step (min.) |
|---|---|---|---|
| 70 | — | — | 60 |
| 37 | 15 | 45 | 60 |
| 25 | 10 | 60 | 70 |
| 23 | 20 | 40 | 110 |
| 19 | 30 | 120 | 150 |

The present invention was executed with a crystallizer equipped with a heat exchange element characterized by a heat exchange surface of 5.5 m$^2$ per ton of oil or fat; this corresponds to a typical value used in the field of oil or fat crystallization, and is within the preferred range. Accordingly, a slurry with uniform crystals resulted.

After the crystallization has proceeded sufficiently far, the batch can be subjected to a separation step yielding the liquid olein and the stearin solids. This step is most commonly carried out by filtration. Although the crystal morphology resulting from the process according to the invention is amenable to filtration by a vacuum drum filter or a moving vacuum belt filter, this type of equipment does not take full advantage of the process according to the invention. Accordingly, other means of separation are recommended. Apart from the membrane filter press that is in common use in industrial fractionation installations for edible oils and fats now that it has become fully automated, a separation process that takes full advantage of the uniformity of the fat crystals, is the process disclosed in U.S. Pat. No. 4,542,036.

The first example of this patent discloses the use of a decanter and, although this type of equipment does not filter the crystal slurry, it compacts the solids in said slurry to such an extent that the resulting stearin fraction is fully comparable with the filter cake produced by a membrane filter press. However, a pressed filter cake still contains liquid (olein) in between the tightly packed fat crystals and a way to eliminate this liquid at least partially is by subjecting the solids to a centrifugal force under conditions whereby the olein can leave the solids so that the liquid phase in between the solids is replaced by atmosphere; this can be attained by the use of a conical sieve or nozzle centrifuge provided with a scroll capable of rotating at a speed differential relative to the screen.

In industrial practice, this latter type of equipment has been shown to be very sensitive to the morphology of the crystals to be separated from their mother liquor: if the slurry contains crystals that are only slightly larger than the holes in the filter screen, these crystals tend to clog these holes, thereby decreasing the permeability of the screen and causing the olein to flow over the screen instead of passing through it. This results in a 'wet' stearin indicative of poor separation efficiency. However, the uniformity of the crystals produced by the process according to the invention and the near absence of small crystals permit the full advantage of the conical sieve centrifuge to be realized because of its: fully continuous operation, lower investment than a membrane press, low space requirement, no need to locate the equipment in a temperature controlled room and low maintenance.

All publications and patent applications mentioned in this specification are herein incorporated by reference to the same extent as if each independent publication or patent application was specifically and individually indicated to be incorporated by reference.

Other embodiments are within the scope of the claims.

What is claimed is:

1. A crystallization process for edible oil and fats and related derivatives carried out in a crystallizer with stationary heat exchange elements, wherein edible oil and fat contents of said crystallizer are made to move along said elements in an oscillatory manner without the use of an internal agitator.

2. The process according to claim 1, in which the crystallizer comprises one or more crystallization vessels each of which comprises two or more compartments.

3. The process according to claim 2, in which each crystallization vessel is independently cooled.

4. The process according to claim 1, in which the heat exchange elements are only used to cool the crystallizer contents and an external heat exchanger is used to heat the crystallizer contents.

5. The process according to claim 1, in which said stationary heat exchange elements are evenly spaced within the crystallizer and have a surface within the range from 1 to 20 m$^2$ per m$^3$ of crystallizer volume.

6. The process according to claim 1, in which contents of said crystallizer are made to move along said heat exchange elements by the intermittent application of pressure.

7. The process according to claim 6, in which the pressure is generated by a ventilator or fan located in a duct connecting the headspaces of the compartments.

8. The process according to claim 6, in which the intermittent application of pressure is by means of gas injected into and released from the headspaces of the compartments.

9. The process according to claim 8, in which said gas is nitrogen or carbon dioxide or a mixture of both.

10. The process according to claim 6, in which the pressure is intermittently generated by means of a reciprocating piston.

11. The process according to claim 6, in which the pressure is intermittently generated by means of a dosing piston pump.

12. The process according to claim 6, in which the amplitude of the movements of the crystallizer contents along the stationary heat exchange elements is from 0.01 m to 0.50 m.

13. The process according to claim 6, in which the frequency of the movements of the crystallizer contents along the stationary heat exchange elements is between 0.1 and 10 Hz.

14. The process according to claim 1, wherein the crystallization step is operated by batch.

15. The process according to claim 1, wherein the crystallization step is operated continuously.

16. The process according to claim 1, wherein the crystallization step is operated semi-continuously.

17. The process according to claim 1, wherein the frequency of the oscillatory movement corresponds to the eigenfrequency of the crystallizer.

18. The process according to claim 1, in which the material being crystallized is circulated over its crystallization vessel or compartment by a pump.

19. The process according to claim 1 wherein the process is a fractionation process.

20. A dry fractionation process for edible oils and fats, in which a crystal slurry produced according to a crystallization process for edible oil and fats and related derivatives carried out in a crystallizer with stationary heat exchange elements, wherein edible oil and fat contents of said crystallizer are made to move along said elements in an oscillatory manner without the use of an internal agitator is separated into an olein fraction and a stearin fraction.

21. The fractionation process according to claim 20, in which the separation is carried out by means of a conical sieve centrifuge that is provided with a scroll capable of rotating at a speed differential relative to the screen.

22. A crystallizer for edible oil and fats and related derivatives with stationary heat exchange elements, comprising means to move edible oil and fat contents of said crystallizer in an oscillatory manner along said elements in an oscillatory manner without the use of an internal agitator.

23. The crystallizer according to claim 22, in which the crystallizer comprises one or more crystallization vessels, each of which comprises two or more compartments.

24. The crystallizer according to claim 23, in which each crystallization vessel has independent cooling means.

25. The crystallizer according to claim 22, wherein the heat exchange elements are adapted to only cool the crystallizer contents and an external heat exchanger is provided to heat the crystallizer contents.

26. The crystallizer according to claim 22, in which said stationary heat exchange elements are evenly spaced within the crystallizer and have a surface within the range from 1 to 20 $m^2$ per $m^3$ of crystallizer volume.

27. The crystallizer according to claim 22, further comprising means for applying intermittent fluid pressure to move the contents of said crystallizer along said heat exchange elements.

28. The crystallizer according to claim 27, in which the pressure is generated by a ventilator or fan located in a duct connecting the headspaces of the compartments.

29. The crystallizer according to claim 27, in which the intermittent application of pressure is provided by means for gas injection into and release from headspaces of the compartments.

30. The crystallizer according to claim 29, in which said gas is nitrogen or carbon dioxide or a mixture of both.

31. The crystallizer according to claim 27, in which the pressure is intermittently generated by means of a reciprocating piston.

32. The crystallizer according to claim 27, in which the pressure is intermittently generated by means of a dosing piston pump.

33. The crystallizer according to claim 27, in which the means for applying intermittent fluid pressure is adapted to provide an amplitude of the oscillatory movements of the crystallizer contents along the stationary heat exchange elements from 0.01 m to 0.50 m.

34. The crystallizer according to claim 27, in which the means for applying intermittent fluid pressure is adapted to provide the frequency of the movements of the crystallizer contents along the stationary heat exchange elements between 0.1 and 10 Hz.

35. The crystallizer according to claim 34, wherein the frequency of the oscillatory movement corresponds to the eigenfrequency of the crystallizer.

36. The crystallizer according to claim 22, in which the material being crystallized is circulated over its crystallization vessel or compartment by a pump.

37. The crystallizer according to claim 22, further comprising a separator for separating the contents into an olein fraction and a stearin fraction.

38. The crystallizer according to claim 37, in which the separator is a conical sieve centrifuge that is provided with a scroll capable of rotating at a speed differential relative to the screen.

* * * * *